3,299,172
PROCESS FOR THE PREPARATION OF LINEAR THERMOPLASTIC MIXED POLYESTERS HAVING SOFTENING TEMPERATURES ABOVE 100° C.
Gerhard Schade, Witten-Bommern, and Franz Blaschke, Witten (Ruhr), Germany, assignors to Chemische Werke Witten G.m.b.H., Witten (Ruhr), Germany
No Drawing. Filed Sept. 18, 1964, Ser. No. 397,618
Claims priority, application Germany, Sept. 26, 1963, C 30,978
13 Claims. (Cl. 260—860)

This invention relates to linear thermoplastic polyesters. More particularly, it relates to the preparation of linear thermoplastic mixed polyesters. Even more particularly, the invention relates to the preparation of linear thermoplastic mixed polyesters having softening temperatures of above 100° C.

It is known that high-melting aromatic polyaryl esters may be prepared by transesterification and polycondensation of mixtures of diaryl esters of aromatic dicarboxylic acids, also together with diaryl esters of aliphatic dicarboxylic acids or diaryl carbonates, if desired, and dihydric phenols. These polyaryl esters have, however, such high melting viscosities at the temperatures up to which they are still stable against thermal decomposition that the degrees of polycondensation required for obtaining good mechanical properties cannot be reached in the conventional stirring autoclaves.

For the purpose of eliminating this disadvantage, it has already been proposed to replace a part of the dihydric phenols employed in the preparation of such polyaryl esters with equivalent amounts of glycols. However, this process has the disadvantage that it gives a poor reproducibility. In accordance with this known process, it is necessary that the reactants be present in an exactly stoichiometric proportion with respect to each other. Any excess of hydroxyl compounds causes a brown to black discoloration of the polycondensate, because of the insufficient thermal stability of the partial esters of the dihydric phenols still containing free hydroxyl groups which are being formed. On the other hand, in the case of an excess of diaryl esters of dibasic acids, the attainment of sufficiently high degrees of polycondensation is not possible even with the concomitant use of diaryl esters of ordinarily relatively readily volatile dibasic acids, for example, diphenyl carbonate and oxalate, etc.

One of the objects of the present invention is to provide a process for the preparation of linear thermoplastic mixed polyesters having softening points or temperatures of above 100° C. which overcomes the disadvantages and deficiencies of the prior art methods.

Another object of the present invention is to provide a process for the preparation of linear thermoplastic mixed polyesters having softening points or temperatures of above 100° C. wherein desired degrees of polycondensation of the polyester, required for obtaining good mechanical properties, can be easily obtained in conventional stirring autoclaves.

A further object of the invention is to provide a process for the preparation of linear thermoplastic mixed polyesters having softening points or temperatures of above 100° C. which has good reproducibility and which is devoid of the uncertainties of formulation of proportions of reactants encountered with the prior art processes.

These and other objects of the present invention will become apparent to those skilled in the art from a reading of the following specification and claims.

The present invention proposes to overcome the disadvantages of the prior art methods mentioned above encountered in the preparation of linear thermoplastic mixed polyesters having softening points of above 100° C.

The above-described polyesters are conventionally made by transesterification and polycondensation of mixtures comprising 0 to 100 mole percent of diaryl terephthalate, 100 to 0 mole percent of diaryl isophthalate, 0 to 10 mole percent of diaryl carbonate or oxalate, the total amount of said diaryl terephthalate and diaryl isophthalate in said mixture being from 90 to 100 mole percent and the total mole percent of said diaryl terephthalate, said diaryl isophthalate and said diaryl carbonate or oxalate being equal to 100 mole percent, and 100 mole percent of dihydric phenols, preferably bisphenol A (p,p'-dihydroxydiphenyldimethyl methane). Such mixtures may also have present additives known in the art such as the appropriate catalysts and stabilizing agents. The said linear thermoplastic mixed polyesters are prepared by heating the mixture of components mentioned hereinabove to about 320° C. while adding thereto approximately 15 to 120% by weight, based on the weight of polyaryl ester theoretically produced during the transesterification and polycondensation of the starting materials, of a linear thermoplastic polyester consisting of terephthalic acid units, isophthalic acid units or mixtures thereof as well as residues of diprimary dialcohols.

In accordance with the present invention, the above-known process is carried out in such a manner that the polyester containing the dialcohol residues is added to the reaction mixture at temperatures of up to approximately 280° C. as soon as the melting viscosity of the initially formed polyaryl ester has reached a value of about 2000 to 4000 poise under the specified reaction conditions, and the polycondensation reaction is subsequently continued in the presence of this addition until the reaction product displays good mechanical properties.

The dialcohol polyesters employed in accordance with the present invention already contain acid and dialcohol residues in stoichiometric amounts so that the uncertainty in the formulation of the batches caused by the relatively ready volatility of the free dialcohols is eliminated.

A further surprising advantage of the process according to the present invention is that the polycondensation of the aryl esters in the presence of the aforementioned dialcohol polyesters may be carried out with success even if an excess of diaryl esters of readily volatile dibasic acids is present, such as, for example, diphenyl carbonate. This procedure, which is very advantageous in view of the certain achievement or realization of sufficiently high degrees of polycondensation, is not successful when free dialcohols are used, as has already been mentioned hereinbefore.

Aryl esters of terephthalic and/or isophthalic acid which may be used herein include, for example, the phenyl, cresyl, xylenyl and naphthyl esters thereof.

Illustrations of diaryl carbonates or oxalates which may be used in the process of the present invention are, for example, the phenyl, cresyl, xylenyl and naphthyl esters thereof.

Useful as dihydric phenols in accordance with the present invention are, for example, biphenol A, resorcinol and hydroquinone.

Of importance as residues of diprimary dialcohols operative herein are glycols, such as, for example, ethylene glycol, polymethylene glycols, 2,2-dimethylpropane diol, hexahydro-xylylene glycols, di-, tri-, tetra- and pentaethylene glycols, as well as hydroxyethylation products of bisphenol A, hydroquinone and resorcinol.

It has further been found, in accordance with the present invention, that the time of the addition of the dialcohol polyester to the reaction mixture consisting of diaryl terephthalates, diaryl isophthalates, diaryl carbonates or oxalates and dihydric phenols is of great importance with respect to the properties of the end products. If the dialcohol polyester is added to the reaction mixture at the beginning or even after the completion of the transesterification, mixed polyesters are obtained which are relatively brittle, despite a high degree of polycondensation, and which do not display any advantageous properties apart from their high softening points. If, on the other hand, the dialcohol polyesters are added only at the time when the polyaryl esters already possess a melting viscosity of above approximately 2000, preferably about 4000 poise, and if the polycondensation is subsequently continued until the product has a specific viscosity of about 0.7 or above (measured in 60/40 phenol/tetrachloroethane at 25° C., concentration 1 g./100 ml.), opaque, generally faintly yellowish colored masses are obtained which have good mechanical properties and which may serve, for example, for the preparation of molded bodies, coatings, and the like.

The amount of the dialcohol polyesters to be added to the mixture of reactants should generally be between about 15 and 120% by weight, based on the quantity of polyaryl ester theoretically produced. When lower additions are employed, the desired effect of the reduction of the melting viscosity is too low to afford practical advantages in the preparation of the polyaryl esters, whereas larger additions would reduce the softening points of the mixed polycondensates to below 100° C., which is undesirable for a number of intended purposes. The preparation of such mixed polyesters, which is actually also possible according to the present invention, is not claimed herein.

The process for the preparation of the mixed polyesters in accordance with the present invention is described in further detail on the basis of the following examples without, however, being limited thereto.

*Example 1*

A 250 ml. round-bottomed flask with stirrer and descending air cooler, whose lower end was connected to a 100 ml. round-bottomed flask as condenser by means of a vacuum adapter, was charged with 47.7 g. (0.15 mole) of diphenyl terephthalate, 42.9 g. (0.135 mole) of diphenyl isophthalate, 3.42 g. (0.018 mole) of diphenyl carbonate, 68.4 g. (0.3 mole) of bisphenol A, 90 mg. of antimony oxide and 120 mg. of triphenyl phosphite. The apparatus was alternately evacuated and filled with pure nitrogen a total of five times, and the reaction vessel was maintained at 180° C. under nitrogen at normal or atmospheric pressure by means of a metal bath for 2¼ hours for the transesterification. The temperature was increased to 250° C. within another 2 hours and subsequently to 280° C. within another one half hour during the application of a water-jet pump vaccum of about 15 torr. After the main amount of the split-off phenol had distilled over, an oil pump vacuum of about 0.2 torr was applied at 280° C., whereupon the viscosity of the melt increased slowly and amounted to about 4000 poise after approximately 45 minutes. This condition was characterized in that the reaction mass showed a tendency to begin to coil around the stirrer. At this time, the vacuum in the apparatus was discharged by introducing nitrogen thereinto, and a sample was taken whose specific viscosity (measured in 60/40 phenol/tetrachloroethane at 25° C. at a concentration of 1 g. in 100 ml. solution) had the value of 0.48. Then 21.6 g. of a granulated polyethylene terephthalate having a specific viscosity of 0.720, determined as above, was added to the reaction mixture. This amount corresponded to approximately 20% by weight of the quantity of polyaryl ester theoretically produced. Stirring was subsequently continued for about 15 minutes under nitrogen at normal or atmospheric pressure at 280° C., and the oil pump vacuum was thereafter applied again. Because of the addition of polyethylene terephthalate, the melting viscosity was reduced to about 3000 poise; however, the viscosity gradually increased again to about 4000 poise in the course of further reaction. The reaction was interrupted 2½ hours after the addition of the polyethylene terephthalate. The cooled product had a softening point of 147° C. (determined with the aid of a penetrometer; needle cross section 1 mm.$^2$, load 350 g., depth of penetration 0.1 mm.), and a specific viscosity (determined as above) of 0.730. The product was faintly yellowish in color, had a slightly milky appearance and great mechanical strength. In hot chloroform, a portion of the polyester product went into solution, while a swelled residue thereof remained undissolved.

*Example 2*

The procedure of Example 1 was followed again, except with the difference that the polyethylene terephthalate was added at the moment at which the temperature of the reaction mixture had just reached 280° C. The resultant end product had a softening point of 131° C., a specific viscosity of 1.126 and was equally faintly yellowish in color. Despite the high degree of polycondensation attained, the product was so brittle that it could be broken up or comminuted into small pieces by light blows with a hammer.

*Example 3*

Example 1 wes repeated, but instead of 21.6 g. of polyethylene terephthalate, an amount of 32.4 g. of this polyester was added, corresponding to about 30% by weight of the amount of polyaryl ester which was theoretically to be expected. The polycondensation time after the addition of the polyethylene terephthalate amounted to 4½ hours at a temperature of 280° C. and a vacuum of 0.2 torr. The specific viscosity of the end product was determined to be 0.861; the product had a softening point of 139° C. The resin had a faintly gray-yellow color, was somewhat more turbid than the one obtained according to Example 1, and was very hard and tough.

*Examples 4 and 5*

Examples 1 and 3, respectively, were repeated, with the difference that the amount of polyethylene terephthalate added was 43.2 g. in the mixture of Example 1 (about 40% by weight, relative to the amount of polyaryl ester theoretically produced) and 54 g. in the mixture of Example 3 (about 50% by weight, relative to the amount of polyaryl ester theoretically produced). The polycondensation time after the addition of the polyethylene terephthalate was, respectively 4 and 3¾ hours, whereupon the end products had softening points of 131° C. and 126° C., respectively, and specific viscosities of 0.92 and 0.842, respectively. Both resins were only slightly turbid and were faintly yellow in color, hard and tough.

When the softening points of the resins described in the preceding Examples 1, 3, 4 and 5 are plotted as a function of their composition, the resulting curve obtained, after corresponding extrapolation, leads one to expect a softening point of 100° C. for a resin composed of about 55% by weight of polyethylene terephthalate and about 45% by weight of polyaryl ester.

*Example 6*

In agreement with the above prediction, a resin having a composition of about 55% by weight of polyethylene terephthalate and about 45% by weight of polyaryl ester, produced according to the process of Example 1, had a softening point of 102° C. and a specific viscosity of 0.832.

*Examples 7 and 8*

In these examples, the procedure was the same as that used in Examples 1 and 3, respectively, with the difference that added to the reaction mixture, instead of polyethylene terephthalate, were 20% (Example 7) and 30% (Example 8) by weight—based on the amount of theoretically produced polyaryl ester—of a polyethylene terephthalate-isophthalate resin (molar ratio terephthalic acid/isophthalic acid of 60/40) having a specific viscosity of 0.83. The polycondensates thus obtained had softening points of 147° C. and 137° C., respectively, and specific viscosities of 0.730 and 0.710, respectively. These softening points and viscosities correspond closely to those of the resins of Examples 1 and 3. In their appearance and mechanical behavior, they equally corresponded to the resins of Examples 1 and 3, respectively, with the difference that the resins of Examples 7 and 8 were clearly soluble—in contrast to those of Examples 1 and 3—in various solvents, such as, for example, chlorinated hydrocarbons.

*Examples 9 and 10*

The reactant batches and the procedure used in these two examples correspond to those of Examples 1 and 3, respectively, and 7 and 8, respectively, with the difference that a mixed polycondensate consisting of 25 mole percent of terephthalic acid, 25 mole percent of isophthalic acid, 40 mole percent of neopentyl glycol and 10 mole percent of ethylene glycol was used as the glycol polyester. This glycol polyester had a specific viscosity of 0.860. The softening points of the end products were 143° C. and 136° C., respectively, with specific viscosities of 0.700 and 0.705, respectively. Again, these properties correspond closely to those of the resins of Examples 1 and 3 and 7 and 8, respectively. The resins according to Examples 9 and 10 were discolored a little more markedly than those of the preceding examples. The cause therefore was presumably the insufficient purity of the neopentyl glycol. However, these resins were hard and displayed good mechanical properties; their solubility corresponded approximately to that of the resins of Examples 7 and 8, respectively.

*Examples 11 and 12*

In the preceding examples, the composition of the polyaryl ester was maintained constant (molar ratio terephthalic acid/isophthalic acid/carbonic acid of 50/45/5), while the type and amount of the glycol polyesters added were varied. Examples 11 and 12, respectively demonstrate the limited influence of the composition of the polyaryl ester on the properties of the end products when the addition of dialcohol polyesters remains constant. The amounts of the starting materials employed in Example 11 were 23.8 g. (0.075 mole) diphenyl terephthalate, 66.8 g. (0.21 mole) of diphenyl isophthalate, 3.42 g. (0.018 mole) of diphenyl carbonate, 68.4 g. (0.3 mole) of bisphenol A, 90 mg. of antimony oxide and 120 mg. of triphenyl phosphite. The polyaryl ester produced from these starting materials contained, accordingly, 25 mole percent of terephthalic acid-, 70 mole percent of isophthalic acid- and 5 mole percent of carbonic acid residues. In Example 12, the diphenyl terephthalate and diphenyl isophthalate amounts of Example 11 were exchanged with respect to each other, so that the polyaryl ester according to Example 12 contained 70 mole percent of terephthalic acid-, 25 mole percent of isophthalic acid- and 5 mole percent of carbonic acid residues. When the condition described in detail in Example 1 had been reached, 21.6 g. of polyethylene terephthalate was added to each of the polyaryl esters of Examples 11 and 12, respectively, and the mixtures further condensed for another 3¾ hours at 280° C. and a pressure of 0.2 torr. The product resin of Example 11 had a softening point of 141° C. and a specific viscosity of 0.688. The resultant resin of Example 12 had a specific viscosity of 0.713 and a softening point of 148° C. Both resins were tough, hard, slightly turbid, faintly yellowish masses and were hardly distinguishable from the resin of Example 1.

While the invention has been described specifically in the examples with the use of antimony oxide and triphenyl phosphite, it is to be understood that the invention is not to be limited thereto and the catalysts and stabilizing agents known in the art and conventionally utilized in the instant process are intended to be included within the scope of the invention. Examples of such catalysts include alkali and earth alkali phenolates, zinc oxide, and phenolates of these metals. Illustrative stabilizers, mentioned only by way of example, include aryl phosphites, alkyl phosphites, and mixed alkyl aryl phosphites.

The invention being thus described, it will be obvious that the same may be varied in many ways. Such variations are not to be regarded as a departure from the spirit and scope of the invention and all such modifications are intended to be included within the scope of the following claims:

We claim:

1. In a process for the preparation of linear thermoplastic mixed polyesters having softening temperatures of above 100° C. which comprises heating a mixture comprising 0 to 100 mole percent of a diaryl terephthalate, 100 to 0 mole percent of a diaryl isophthalate, 0 to 10 mole percent of a diaryl ester selected from the group consisting of diaryl carbonates and diaryl oxalates, the total amount of said diaryl terephthalate and diaryl isophthalate in said mixture being from 90 to 100 mole percent and the total mole percent of said diaryl terephthalate, said diaryl isophthalate and said diaryl ester being equal to 100 mole percent, and about 100 mole percent of a dihydric phenol to about 320° C. to effect a transesterification and polycondensation to produce a mixed polyester, the improvement which comprises adding to said mixture at temperatures of up to about 280° C. as soon as the melting viscosity of said mixture reaches a value of from about 2000 to 4000 poise at said temperature about 15 to 120% by weight, based on the theoretical weight of polyester produced by said transesterification and polycondensation, of a linear thermoplastic polyester consisting of units of residues of a diprimary dialcohol and residues of an acid selected from the group consisting of terephthalic acid, isophthalic acid and mixtures thereof, and subsequently continuing the polycondensation reaction until a linear thermoplastic mixed polyester product having desired mechanical properties is obtained.

2. A process according to claim 1, wherein said mixture additionally contains a suitable transesterification and polycondensation catalyst.

3. A process according to claim 1, wherein said mixture additionally contains a suitable stabilizing agent therefor.

4. A process according to claim 1, wherein said dihydric phenol is selected from the group consisting of bisphenol A, resorcinol and hydroquinone.

5. A process according to claim 4, wherein said dihydric phenol is bisphenol A.

6. A process according to claim 1, wherein said diaryl group is selected from the group consisting of phenyl, cresyl, xylenyl and naphthyl groups.

7. A process according to claim 1, wherein said added linear thermoplastic polyester is polyethylene terephthalate.

8. A process according to claim 1, wherein said diprimary dialcohol is selected from the group consisting of ethylene glycol, polymethylene glycols, 2,2-dimethylpropane diol, hexahydro-xylylene glycols, diethylene glycol, triethylene glycol, tetraethylene glycol, pentaethylene glycol, hydroxyethylation products of bisphenol A, hydroxyethylation products of hydroquinone and hydroxyethylation products of resorcinol.

9. A process for the preparation of a linear thermoplastic mixed polyester having a softening temperature of above 100° C. which comprises heating a mixture comprising 0 to 100 mole percent of diphenyl terephthalate, 100 to 0 mole percent of diphenyl isophthalate, 0 to 10 mole percent of a diaryl ester selected from the group consisting of diphenyl carbonate and diphenyl oxalate, the total amount of said diaryl terephthalate and diaryl isophthalate in said mixture being from 90 to 100 mole percent and the total mole percent of said diphenyl terephthalate, said diphenyl isophthalate and said diaryl ester being equal to 100 mole percent, about 100 mole percent of bisphenol A, a polyesterification catalyst, and a suitable stabilizer to about 280° C., adding to said mixture at a temperature of up to about 280° C. as soon as the melting viscosity of said mixture reaches a value of from 2000 to 4000 poise at said temperature about 15 to 120% by weight, based on the theoretical weight of polyester produced in said process, of polyethylene terephthalate, and subsequently continuing the reaction by heating until a linear thermoplastic mixed polyester product having desired mechanical properties is obtained.

10. A process according to claim 1, wherein said added linear thermoplastic polyester has a specific viscosity, as measured in 60:40 phenol/tetrachloroethane at 25° C. at a concentration of 1 gram thereof in 100 ml. of solution, of about 0.7.

11. A process according to claim 9, wherein said added linear thermoplastic polyester has a specific viscosity, as measured in 60:40 phenol/tetrachloroethane at 25° C. at a concentration of 1 gram thereof in 100 ml. of solution, about 0.7.

12. A process according to claim 1, wherein the resultant linear thermoplastic mixed polyester product has a specific viscosity of about 0.7, as measured in 60:40 phenol/tetrachloroethane at 25° C. at a concentration of 1 gram thereof in 100 ml. of solution.

13. A process according to claim 9, wherein the resultant linear thermoplastic mixed polyester product has a specific viscosity of about 0.7, as measured in 60:40 phenol/tetrachloroethane at 25° C. at a concentration of 1 gram thereof in 100 ml. of solution.

References Cited by the Examiner

UNITED STATES PATENTS

| 2,692,249 | 10/1954 | Lincoln | 260—860 |
| 3,000,849 | 9/1961 | Clachan et al. | 260—860 |

FOREIGN PATENTS

| 1,287,519 | 2/1962 | France. |
| 1,302,051 | 7/1962 | France. |

MURRAY TILLMAN, *Primary Examiner.*

J. T. GOOLKASIAN, *Assistant Examiner.*